UNITED STATES PATENT OFFICE 2,362,332

CORROSION PREVENTIVE COMPOSITIONS

John C. Zimmer, Union, and Ejnar W. Carlson, Roselle Park, N. J., assignors to Standard Oil Development Company, a corporation of Delaware No Drawing. Application June 29, 1940, Serial No. 343,258

12 Claims. (Cl. 106—14)

This invention relates to compositions for preventing the corrosion of metals and metal articles and particularly to rust-proofing compositions containing a particular class of organic amines.

A large number of rust-proofing compositions are now available on the market, most of them being applicable for use under specific storage or operating conditions. Among the best of these compositions is a product composed of dégras and alkaline metal salts of oil-soluble sulfonic acids derived from petroleum by treating petroleum oil with concentrated sulfuric acid. Such compositions may contain fatty residues or distillation residues of synthetic acids produced by low temperature liquid phase of catalytic oxidation of hydrocarbon wax at atmospheric pressure, as disclosed in U. S. Patent 2,184,952. These patents as well as other compositions now employed in the art involve the use of some amines and particularly certain tertiary alkyl phenol amines of the type sold on the market under the trade name of "Hyamine A."

Many of the present art compositions show excellent service against high humidity and high temperatures; others are especially suitable for protection against outdoor weather, rain, salt mist and spray, whereas some others are specifically adapted for service against acid solutions. In the protection of automotive engines and especially aviation engines, special conditions are encountered which demand requirements for corrosion preventives of such scope that present art compositions have been unable to meet all of the requirements for such service. For example, after aviation engines are assembled, they are tested to make certain that they meet power rating and other specifications and then are stored for such a period of time until they are called into regular service. The general practice is to coat the interior surfaces of such engines after testing so that no deterioration will take place upon storage and that no faults will be found after the engine is placed into service.

In order to be suitable for such service, therefore, a rust preventive must give protection against high humidity; it must likewise maintain adhesion and furnish protection at high temperatures. Furthermore, such a composition must prevent corrosion of the various engine construction metals in the presence of salt mist and spray and must give protection against acid solutions formed by condensation of combustion gases. In addition to these requirements, the rust-proofing agent must not exhibit any detrimental effect upon the metals employed in the engine bearings and parts when the engine is placed in service, and also, it must be readily removable from the engine crankcase by draining. One important requirement is that the rust-proofing agent have no detrimental effect upon crankcase oils, especially with respect to oxidation stability and corrosiveness upon lead or other alloy bearings. Likewise, it must be soluble in crankcase oils so that it may be readily washed out by the lubricant. An additional requirement is that such a composition must be free from gum or any tendency to form oil insoluble deposits, lacquers, resins, etc. Furthermore, certain Army and other specifications require the composition to possess sufficient alkalinity so as to neutralize acidity present in exhaust condensates of doped gasolines. Hence, it can be seen that these requirements are extremely rigid and of extreme importance to the manufacturer and user of aircraft and other internal combustion engines. Although all of the prior art materials satisfy these requirements in one or more respects, no particular one, so far examined, has been found to meet all of these requirements.

One object of the present invention is to produce a rust preventive or preservative composition which will satisfactorily meet all of the re-requirements hereinbefore set forth. Another object is to modify rust preventive compounds containing saponaceous (i. e. saponifiable or saponified) constituents which normally corrode lead, silver, copper, tellurium, etc., alloy bearings and similar metal compositions at engine operating temperatures so as to free them of any corrosive effect upon such alloys. Further objects will be apparent from the description set forth below.

The present invention involves the use in corrosion preventive compositions of an organic amine having a structural formula as follows:

Where R consists of an aliphatic hydrocarbon group, R' consists of hydrogen or an aliphatic or cyclic radical while R" consists of an aliphatic or cyclic radical. These compounds must be secondary or tertiary amines which are substantially non-volatile, having a boiling point in excess of about 250° F. The aliphatic hydrocarbon group, R, is preferably of low carbon content, say up to or over five carbon atoms, while the aliphatic groups designated by R' or R" are preferably alkyl groups which may contain up to eight carbon atoms although any or all of these can contain up to twenty carbon atoms and still be of value for the present purpose. The cyclic radical in R' or R" may be aromatic, naphthenic or heterocyclic and may contain substituents such as OH, NH₂, Cl, etc. There is no limitation as to the number of nuclei, although mono-nuclear groups are more desirable.

The compositions preferred for the present invention are saponaceous-containing mixtures, especially those which contain at least four materials: (1) the active base which consists of mahogany soaps from petroleum sources (preferably alkali metal or ammonium salts); (2) saponifiable materials such as dégras, fatty oils, fatty residues such as cottonseed pitch, linseed distillation residue, stearin pitch, etc., or distillation residues of oxidized hydrocarbons, e. g., the residues obtained upon distillation of synthetic acids in the fatty range obtained by low temperature oxidation of paraffin wax. It is preferable, however, to employ a mixture of mahogany soap and dégras in the ratio of 1:1 to 15:1 or in the ratio of 1:1 to 1:15 as disclosed in U. S. Patent 2,182,992; (3) a heavy mineral oil such as a petroleum lubricating oil, especially of the naphthenic, e. g. Coastal type, although Pennsylvania, Mid-Continent, South American, and even synthetic oils as well as other viscous hydrocarbons or blends thereof with waxes, petrolatums and the like, may be employed; (4) an organic amine as hereinabove set forth. The finished composition will generally contain about 10–20% of mahogany soap and fatty oil in the ratio already specified, 0.5 to 5% (preferably about 2% of the particular organic amine hereinbefore set forth), and the remainder being the mineral oil.

The preferred amino compounds for this purpose, however, are those organic amines falling within the formula given above which possess substantial solubility in both oil and water, and in which there is only one HOR— group and this is an ethanol group. Furthermore, it is likewise preferable that R' and R" be aliphatic groups containing up to four carbon atoms. Diethyl aminoethanol, sometimes referred to as hydroxy ethyl diethylamine, possessing the formula

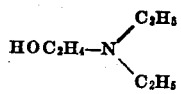

and possessing a pH of about 10, has been found admirably adapted for this purpose. Another good amine suited for this service is dibutyl aminoethanol. A further example of an amine showing fair service for the present purpose is (p-tertiary amyl phenyl) monoethanolamine

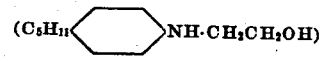

These amino compounds are generally employed in small amounts, i. e., about 0.1 to 5%, although in some cases as much as 10% or more may be found desirable.

As pointed out previously, it is important that these compounds do not affect the properties of the lubricant employed in the crankcase of the engine. Tests have shown that, after the crankcase and engine parts have been coated with a rust-proofing agent of the type described herein, and sufficient lubricating oil has been added to the crankcase for satisfactory operation of the engine, the crankcase oil in the first instance will contain approximately 5% of the rust-proofing agent dissolved therein. Hence, if the rust-proofing agent has a corrosive effect upon the bearings, as is usually the case with saponified compounds, the engine life will be reduced within a short time, especially under aviation engine conditions where high temperatures are normally encountered. Tests carried out with compositions of the present invention have proven that the lubricant is not only unharmed in this respect, but often has been improved to a substantial degree mainly because of the beneficial effect of the particular amino compounds employed for modifying the rust-proofing composition described previously.

In order to point out the difficulties encountered by prior art rust-proofing materials in meeting requirements for such service, Table I is presented giving a comparison of compositions available on the market with those prepared in accordance with the present invention. Composition A is a commercial rust-preventive containing mineral oil, oleic acid and a chromate. Composition B is another well-known rust preventive consisting of a naphtha solution of oxidized petroleum and a small amount of a tertiary alkyl phenolamine. Composition C is another rust-proofing composition on the market employed for purposes of rust-proofing engine parts and other metal objects and containing lard oil, aluminum stearate and a small amount of triethanol amine. Composition D is a preventive employed by an airplane manufacturer and consists of a gasoline solution of oxidized lard oil with an alkylated phenol amine. Composition E is a rust-preventive prepared according to specification 3568–D of the U. S. Army Air Corps containing an oil soluble castor oil, lard oil and a tertiary alkyl phenolamine. All of these are compared with a rust-proofing composition prepared according to the present invention containing a Coastal oil of about 65 seconds viscosity Saybolt at 200° F. with 15% of a mixture which consists of dégras and sodium mahogany sulfonate in the ratio of 1:2 together with 2% of diethyl aminoethanol on the basis of the finished product containing fatty and mineral constituents:

TABLE I

*Evaluation of aviation engine rust preventives*

| Rust preventive | Present invention | Composition |||||
|---|---|---|---|---|---|---|
| | | A | B | C | D | E |
| Protection against high humidity | Pass | Fail | Pass | Fail | Pass | Fail. |
| Adhesion and protection at high temperatures | do | Pass | do | do | do | Do. |
| Protection against salt mist and spray | do | Fail | do | do | do | Do. |
| Protection against acid solutions | do | do | do | do | do | Pass. |
| Effect on metals present in engines | do | do | do | do | do | Fail. |
| Ease of removal from engine (draining) | do | do | Fail | do | Fail | Fail. |
| Effect on crankcase oils oxidation stability | do | Pass | Insol. | do | do | Pass. |
| Effect on crankcase oils corrosiveness | do | do | do | do | Pass | |
| Solubility in crankcase oils | do | do | Fail | Pass | Fail | Fail. |
| Freedom from gum | do | do | do | Pass | do | Pass. |
| Alkalinity | do | Fail | Pass | Fail | Pass | Fail. |
| | do | Fail | Pass | Pass | Pass | Pass. |

As can be seen from this table, only the composition prepared according to the present invention passes all of the requirements called for rust-proofing metals under severe operating conditions and especially in protecting internal combustion engines such as aircraft engines. That most amines will not give the desired effect in such compositions is demonstrated by the data given in Table II below.

TABLE II

*Aviation engine rust preventive effect of amines*

| Mahogany soap-dégras— (1:2)+amine | Lead corrosion test-loss mgs. | Humidifier, hours | Neutralizing of HBr solution |
|---|---|---|---|
| Without amine | 24-35 | 200+ | Poor. |
| With 2% diethylaminoethanol | 2 | 200+ | Very good. |
| With 2% phenylethanolamine | 30 | 200+ | Good. |
| With 2% dicyclohexanolamine | 4-13 | 29 | Poor. |
| With 2% di-isopropanolamine | 51 | 72-144 | Do. |
| With 2% p-tert-amyl phenyl monoethanol amine | 6 | 200+ | Fair. |
| With 2% dibutyl amino ethanol | 3 | 72-144 | Do. |
| With 2% triamylamine | | | Poor. |
| With 1% diphenyl amine | 19 | 200+ | Do. |
| With ½% commercial tert-alkylated phenol amine (supersaturated). | 26 | 200+ | Fair. |

It will be observed that of all of the materials tested only the compounds falling within the structural formula specified in the present invention (diethylaminoethanol, dibutyl amino ethanol, and p-tertiary amyl phenyl monoethanolamine) satisfactorily pass all three tests. On the other hand, many of the amines pass some of the tests very satisfactorily but break down in others.

The rust-proofing blend prepared in accordance with the present invention may be dissolved in naphtha or other light hydrocarbon solution with or without heavy mineral lubricating oils and other ingredients such as alcohols, alkali, alkaline earth, or heavy metal soaps, waxes, petrolatums, linear polymer thickeners, pour inhibitors, dyes, antioxidants containing nitrogen (e. g. phenyl alpha naphthylamine), or phenolic or phenolic ether groups, etc., (e. g. t-butyl ether of p-tertiary butyl cresol), metal passifiers such as amine-aldehyde or ammonia-methylene chloride alkylated phenol condensation products, fatty oils, fatty oil metal or organic base soaps, resins, and similar blending ingredients may be added.

Although the examples have been specifically directed to the protection of aviation engines, the invention is not limited to such metal objects, although it appears to be highly adapted for such service. Obviously, it is possible to protect metal bearings, machinery parts and other metal objects subjected to storage and operation under corrosive conditions.

The composition may also be used on firearms, ordnance, and other equipment where acidic residues may be deposited during use of the equipment. Other uses include the preservation of metal bars, rods, billets, rolled or otherwise, formed alloys which may or may not be subjected to acid pickling or scale removing operations during the course of manufacture.

We claim:

1. A corrosion preventive composition for metals comprising a petroleum fraction, a saponaceous material and 0.1-5% of an organic amine having a boiling point above approximately 250° F. and having a structural formula

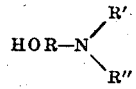

wherein R is an aliphatic hydrocarbon group, R' is a group of the class consisting of hydrogen, aliphatic, and aromatic hydrocarbon radicals and R'' is a group of the class consisting of aliphatic and aromatic hydrocarbon radicals.

2. A corrosion preventive composition according to claim 1 in which the saponaceous material comprises a saponifiable material.

3. A corrosion preventive composition according to claim 1 in which the saponaceous material consists of a mahogany soap and a fatty compound selected from the group consisting of dégras, fatty oils, and fatty oil distillation residues.

4. A rust preventive composition according to claim 1 in which R' and R'' are aliphatic hydrocarbon radicals.

5. A rust proofing composition according to claim 1 in which R' and R'' are aliphatic hydrocarbon radicals containing up to 4 carbon atoms and HOR is the ethanol radical.

6. A composition according to claim 1 in which the saponaceous material comprises a mixture of dégras and mahogany soap.

7. A composition according to claim 1 in which the saponaceous material comprises a mixture of mahogany soap and dégras in the proportions of 1:15–15:1.

8. A composition according to claim 1 in which the organic amine is diethyl aminoethanol having the formula $HOC_2H_4-N-(C_2H_5)_2$.

9. A rust proofing composition consisting of 83% petroleum distillate, 15% of saponaceous material consisting of a mixture of mahogany soap and dégras in the proportions of 1:15–15:1 and 2% of diethyl aminoethanol.

10. A rust-proofing composition according to claim 1 in which R' and R'' are aliphatic alkyl groups and HOR— is a carbinol radical.

11. A composition according to claim 1 in which the amino compound is dibutyl aminoethanol.

12. In composition according to claim 1 in which the amino compound is (p-tertiary amyl phenyl) monoethanol amine.

JOHN C. ZIMMER.
EJNAR W. CARLSON.